April 30, 1935.   J. E. GLOEKLER   1,999,809
MEAT HOLDER
Filed July 5, 1934
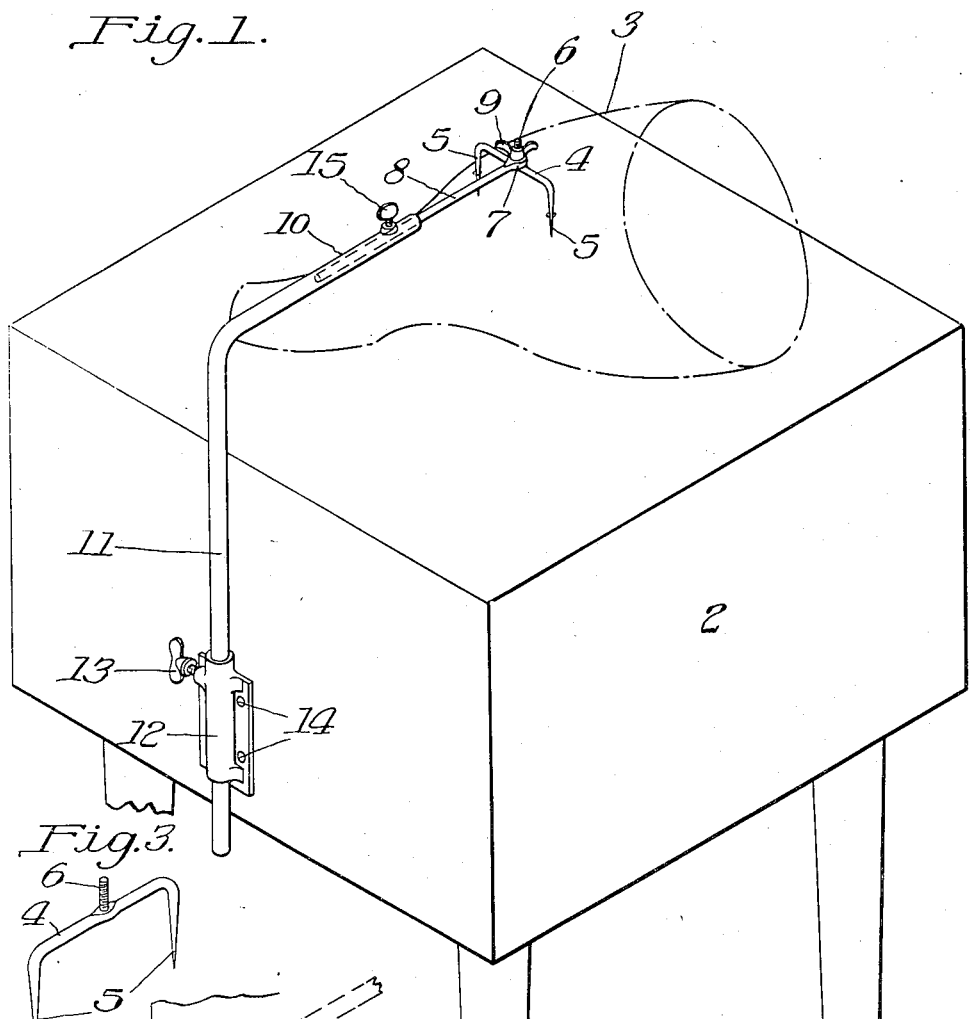
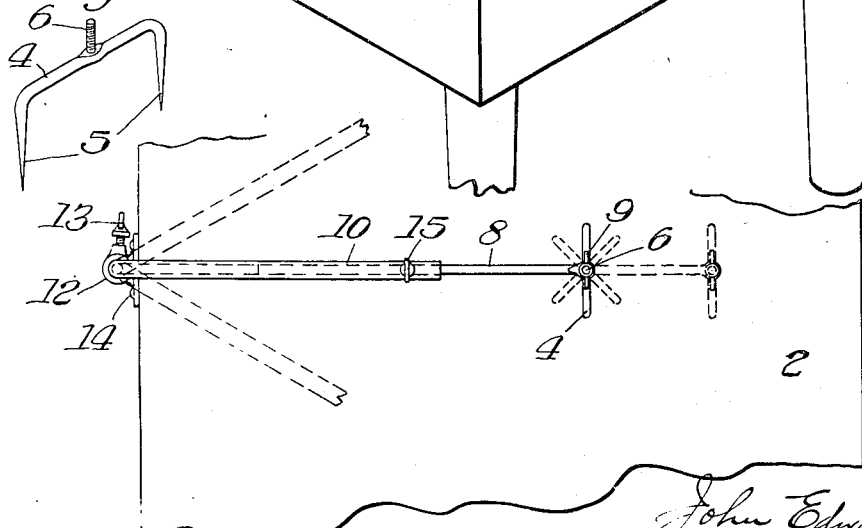

Patented Apr. 30, 1935

1,999,809

UNITED STATES PATENT OFFICE 1,999,809

MEAT HOLDER

John Edward Gloekler, Pittsburgh, Pa.

Application July 5, 1934, Serial No. 733,842

3 Claims. (Cl. 146—218)

This invention consists of an improvement in meat holders adapted to engage and firmly hold a joint, leg, shoulder or other meat unit in firm contact with the surface of a block, for cutting and bone sawing.

It has in view to provide a strong and substantial holder, mounted on the side of the block for vertical and lateral adjustment, having a variably adjustable terminal securing fork, as hereinafter more fully described.

In the drawing:

Fig. 1 is a perspective view showing the invention as located and used on a block;

Fig. 2 is a plan view of the same;

Fig. 3 is a perspective detail view of the terminal fork.

Referring to the drawing, 2 is a conventional block commonly used by butchers for cutting meat from a main unit 3.

Such units usually vary greatly in size, shape and contour, and are somewhat mobile and frequently tend to slide or move on the block surface, as a slice or portion is removed. It is desirable therefore to hold the meat unit very firmly by means capable of accommodation to the variable surface exposed. To this end I have provided a double spike fork 4 having the spaced apart pointed tines 5 adapted to be inserted in the unit 3, as in Fig. 1.

Fork 4 is provided with a middle stem 6 extending upwardly through the terminal eye 7 of a cylindrical rod 8.

A thumb nut 9 has threaded connection with the stem 6 for tightening and loosening, by which the fork may be fixedly held in any laterally adjusted position with relation to the longitudinal axis of rod or stem 8. Said rod is itself longitudinally adjustable by its telescoping mounting in the horizonally arranged tubular arm extension 10, which extends inwardly over the block from its vertical supporting stem 11.

The rod 8 is also rotatable in the arm extension 10 thereby adapting the points of the tines 5 to be accurately presented to the surface of the unit at the best operative angle for thrusting engagement. When so presented, the entire device may be lowered with sufficient pressure to firmly insert the tines, the main stem 11 being then secured by the thumb screw 13.

The lateral extension of stem 11, in the horizontal portion, or the entire holding arm 11—10, may be readily formed of a section of piping or tubing, bent as shown and of sufficient length to provide for ample lateral swinging adjustment and vertical adjustment in the receiving bracket 12.

The bracket is of hollow cylindrical construction, adapted to freely receive the stem 11 for either or both of such adjustments and to be held by engagement of the inner terminal of thumb screw 13 mounted in the side of the supporting bracket. Such bracket is fixedly secured by its oppositely extending flanges and screws or bolts 14 at any convenient position on the side face of the block 2.

As indicated in Fig. 2, the tubular arm 10 may be swung laterally to any desired location by loosening the set screw 13 and may be also raised for placement of the unit 3, and then lowered to effect holding engagement therewith. Rod 8 is extensible in tubular terminal arm 10 and fixedly held therein by the thumb screw 15, while the fork 4 may be swung laterally on its stem 6 and then secured at any desired angle, with or without rotation of stem 8, depending on the variable contour of the unit into which the fork tines are inserted for secure engagement.

By such construction I provide a range of varying adjustments adapting the device to a considerable latitude of placement and holding action, and from a minimum to a maximum vertical movement.

Also, the longitudinal and rotatable adjustment of rod 8, and the lateral adjustment of the fork enable the operator to engage the unit at the most favorable location for secure holding thereof during the operation of severance by a knife or saw.

The construction and operation of the invention will be readily understood and appreciated by all those familiar with the practice of cutting meat from a large unit on a block or the like.

It is comparatively simple, cheap, durable, not likely to get out of order, and has the ample capacity for use with many and various shapes, sizes, and surface contours of the usual commercial meat units.

What I claim is:

1. In combination with a meat block provided at one side with a vertical tubular socket having a securing device, a vertical standard adjustably mounted therein having a lateral hollow extension provided with a set screw, a longitudinally extensible arm mounted therein provided with a terminal eye, and a meat holding fork having a stem engaging the eye and provided with a tightening nut.

2. In combination with a meat block provided at one side with a vertical tubular socket having a securing device, a vertical standard adjustably mounted therein having a lateral tubular extension provided with a set screw, a longitudinally extensible rod rotatably mounted therein provided with a terminal eye, and a rotatable double tine meat holding fork having a stem engaging the eye and provided with a tightening thumb nut.

3. A meat holding device for a cutting block consisting of a vertically and laterally adjustable standard having a laterally extending tubular arm provided with a set screw, a cylindrical stem telescopically mounted in the tubular arm and provided with a terminal eye, and a double tine fork having a threaded stem freely engaging the eye and provided with a tightening thumb nut.

JOHN EDWARD GLOEKLER.